Sept. 19, 1944.  R. D. EISAMAN  2,358,320
FISH FOOD AND METHOD OF MAKING
Filed Feb. 23, 1940  2 Sheets-Sheet 1
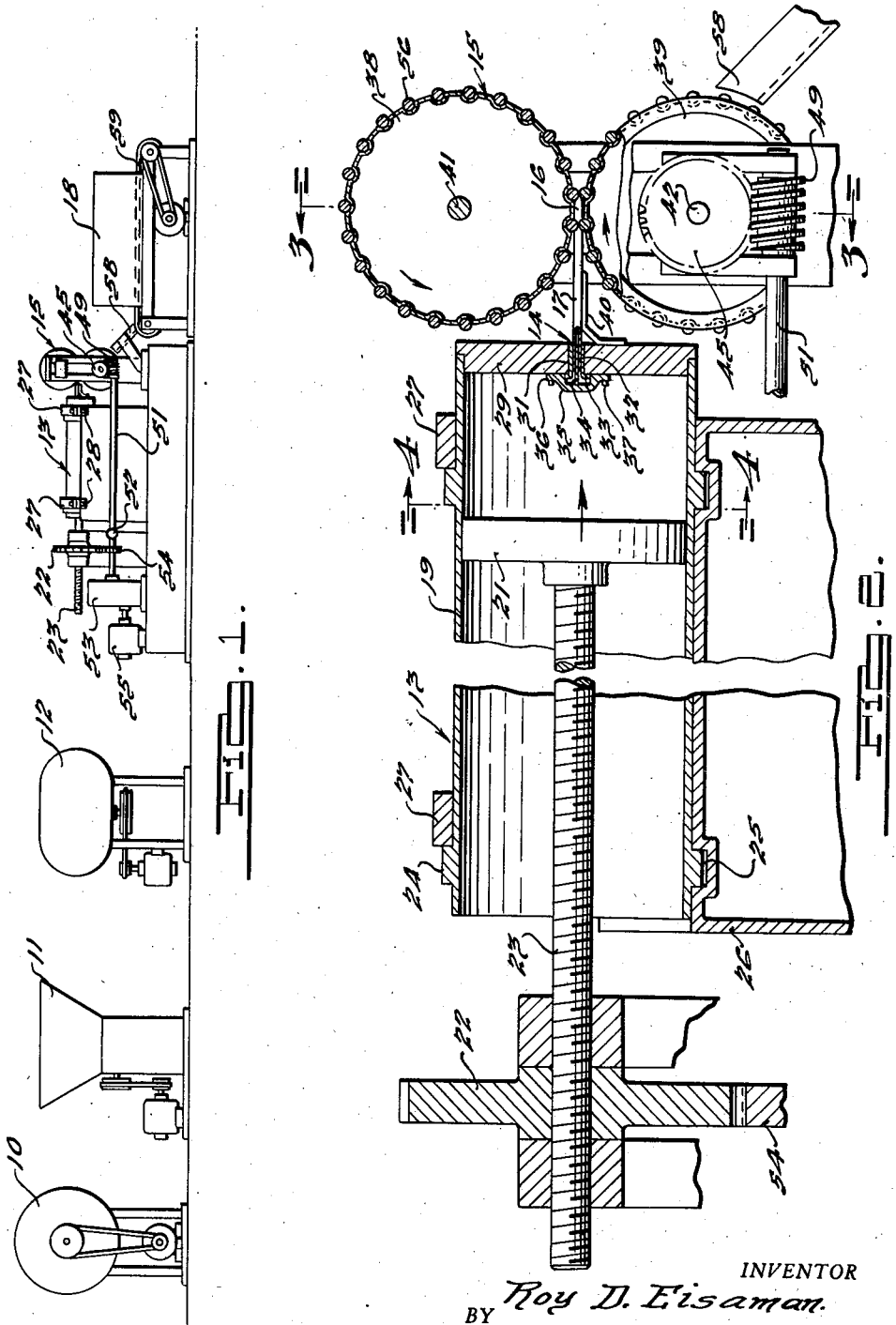
INVENTOR
Roy D. Eisaman.
BY
Harness, Dickey & Pierce.
ATTORNEYS.

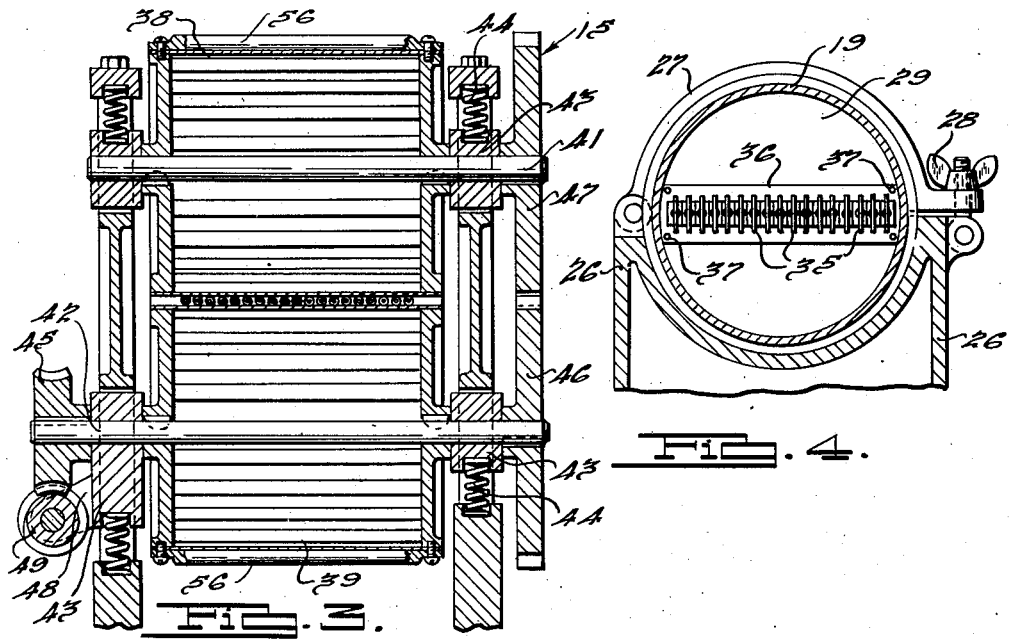

Patented Sept. 19, 1944

2,358,320

UNITED STATES PATENT OFFICE 2,358,320

FISH FOOD AND METHOD OF MAKING

Roy D. Eisaman, Oak Park, Ill., assignor to Jasper Foods, Newport, Mich., a partnership composed of Roy D. Eisaman, Paul F. Seibold, and Arthur C. Johnson Application February 23, 1940, Serial No. 320,345

5 Claims. (Cl. 99—2)

My invention relates to fish foods, and particularly to a method and means for manufacturing a fish food from predetermined ingredients and in such manner as to float upon the water.

The present invention contemplates the manufacture of a fish food out of a number of predetermined ingredients selected to produce a balanced diet with relation to the calorie content, with the inclusion of proteins, fats, amino acids, and fat soluble vitamins. The various ingredients are ground to an exceedingly fine consistency and are thoroughly mixed to provide complete distribution. Water is added and the mixture is kneaded to a dough-like consistency. The kneaded mixture is forced through extruding dies which form hollow tubes which are passed through a cut-off and sealing mechanism to form hollow sealed pellets which are dried and which will float upon water because of the sealed hollow interior. It was found in practice that the ingredients themselves form the binder to retain the particles together, and that the pellets when dried will float upon the water for an hour or more before disintegrating. It is to be understood that suitable binders, such as dextrine and the like may be employed to insure a greater time of floating of the particles, and that it is within the purview of my invention to coat the exterior surface with a water resistant substance so that the pellets will float indefinitely.

Accordingly, the main objects of my invention are: to provide a fish food which floats; to provide a manufactured food having a hollow interior sealed at the ends; to form a floating pellet of food materials which form the binder for retaining the materials in pellet form; to form a floating pellet in the nature of fish food from a plurality of ingredients which provides a balance of proteins, fats, amino acids and fat soluble vitamins; to extrude a food substance from dies forming continuous hollow tubes which are cut off in predetermined lengths and sealed at the ends to form pellets having hollow interiors; and in general, to provide a food for fish from balanced ingredients which are thoroughly mixed, kneaded and extruded from dies and formed into pellets which float.

Other objects and features of novelty of my invention will be either specifically pointed out or will become apparent when referring, for a better understanding of my invention, to the following description taken in conjunction with the accompanying drawings, wherein:

Figure 1 is a diagrammatical view of the machinery employed to practice my invention;

Fig. 2 is an enlarged sectional view of the extruding, cut-off and sealing devices illustrated in Fig. 1;

Fig. 3 is a sectional view of the structure illustrated in Fig. 2, taken on the line 3—3 thereof;

Fig. 4 is a sectional view of the structure illustrated in Fig. 2, taken on the line 4—4 thereof;

Fig. 5 is a view of structure similar to that shown in Fig. 2, showing a modified form thereof;

Fig. 6 is an end view of the structure illustrated in Fig. 5;

Fig. 7 is an enlarged sectional view of the cut-off blades illustrated in Fig. 5;

Fig. 8 is a perspective view of one of the pellets after being severed in the cut-off mechanism.

While various ingredients might be employed in the dough to be formed into the floating pellets which constitutes one part of my inventive concept, I prefer to employ certain types of ingredients which form a balanced food ration. Such foods as wheat, rice, bran, corn, soy bean meal, tomato pulp, cheese, egg shell, bread crumbs, salmon egg meal, shrimp meal, meat scrap and the like are employed for one purpose or another to produce a balance of proteins, fats, amino acids and fat soluble vitamins. A specific food which was compounded contained the following ingredients.

| | Percent |
|---|---|
| Wheat puffs | 15 |
| Rice puffs | 7 |
| Bran flakes | 5 |
| Corn flakes | 5 |
| Soybean meal | 10 |
| Dehydrated tomato pulp | 10 |
| Cotton seed meal | 10 |
| Cheese | 2½ |
| Egg shell | 10 |
| Dehydrated bread crumbs | 10 |
| Salmon egg meal | 2½ |
| Herring fish meal | 2½ |
| Shrimp meal | 2½ |
| Crab meal | 2½ |
| Meat scrap | 5 |
| Dried yeast | ¼ |
| Vitamelk | ¼ |

The Vitamelk is a prepared product made from the following ingredients.

| | |
|---|---|
| Dried skim milk | Ground oat groats |
| Milk sugar feed | Dried crab meat |
| Fish meal | Kelp |
| Soybean oil meal | Molasses |
| Corn gluten meal | Dehydrated alfalfa leaf meal |
| Cod liver oil | |
| Wheat germ meal | Dehydrated spinach |
| Corn germ meal | Dehydrated tomato |
| O. P. linseed meal | Dehydrated orange |

It is to be understood that all of the ingredients in the proportions set forth need not be utilized and that the various proportions may be changed. It is also within the purview of my invention to include drugs among the ingredients, for medicinal purposes. Iodine, for example, may be added in foods for fresh water fish. The particular form and method of manufacture of food lends itself very readily to the inclusion of drugs for medicinal or other purposes. The ingredients can be procured in the open market in cooked form so that it is only necessary to grind the various substances to proper size, and after mixing, knead them to form a stiff dough.

In Fig. 1, I have illustrated a grinder 10 in which the various ingredients may be ground to proper size. The various ingredients are then disposed in a mixer 11 where they are thoroughly distributed. Water is added and the mixture is transferred to a kneading machine 12 in which it is worked to a dough of proper consistency with the ingredients perfectly distributed to provide a homogeneous mass. The dough is then placed in the extruding chamber 13 where it is forced through a plurality of dies 14 and advanced through a sealing and cut-off device 15 to form the food pellets 16. The dies produce tubular lengths of the extruded material which, when cut off are sealed and formed into pellets having a hollow interior which are passed through a drying oven 18 to be thoroughly dried.

Referring more particularly to Figs. 2, 3, and 4, the extruding chamber 13 embodies a cylinder 19 having a ram head 21 therein which is driven by a threaded gear 22 operating on a lead screw 23 which is secured to the ram head. The cylinder 19 is provided with annular shoulders 24 nested in grooves 25 in a cradle 26. Hinged semi-cylindrical bands 27 extend about the upper half of the cylinder 19 and are anchored by suitable means to the cradle 26, as by thumb nuts 28. After the ram 21 is retracted, the cylinder may be removed for repair or for refilling.

The dough, as received from the kneader 12, is packed within the cylinder 19 and the ram head 21 is moved forwardly as the lead screw is advanced by the gear 22. The forward end of the cylinder contains a head 29 having a plurality of apertures 31 therein in which hardened die bushings 32 are inserted and retained by a shoulder 33. Rods 34 extend within the bushings 32 being maintained in position on cross bars 35 which are mounted on a frame 36 secured to the head by bolts 37. Space is provided between the bars to permit the passage of the dough about the rods 34 and through the bushing 32 to thereby produce the continuous tubular length 17 of the dough. A frontwardly projecting shelf 40 is mounted on the outer surface of the head 29 to support the extruding tubular lengths 17 as they advance to the cut-off and sealing mechanism 15.

The cut-off and sealing mechanism embodies a pair of rotors 38 and 39 mounted on shafts 41 and 42, respectively, which are journalled in slides 43 which are spring-pressed toward each other by springs 44. The shaft 42 is driven by a worm wheel 45 which drives through a gear 46 and a gear 47 to drive the shaft 41 so that the rotors 38 and 39 operate in synchronism. The guide 43, adjacent to the worm 45, supports a bracket 48 which forms a bearing for a shaft 51 on which a worm 49 is supported in mesh with the worm wheel 45. The shaft 51 is driven through a universal joint 52 from the speed reducing unit 53 which drives a gear 54 and the gear 23 which drives the ram 21. A motor 55 drives the speed reducer 53 to drive the ram and cut-off mechanism in synchronism.

The rotors 38 and 39 are provided with a plurality of spaced bars 56 about their peripheries disposed to engage each other on the center line between the shafts. The spacing of the rods regulates the size of the pellets which are cut off and sealed as the rotors are advanced at the same speed as the extruded lengths of tubular dough advances from the dies. By having the rotor spring mounted, the engagement of the bars occurs forwardly of on-center position so that a wiping action occurs between the line of abutment therebetween. The severing of the pellets is added by the advancement of the bars to on-center and beyond the on-center positions. The bars fold the walls of the tubes onto each other and thereby seal the ends of the pellets. Through the wiping action and the pressure between the bars, a complete severing of the pellet from the tubular length of dough occurs. By having the cut-off mechanism synchronized with the mechanism for driving the ram the cut-off mechanism will remain timed with the extrusion of the dough irrespective of the speed at which the extrusion occurs.

The pellets 16 fall into a trough 58 on to a belt 59 which is slowly advanced through the oven 18 to produce the drying of the pellets. As pointed out hereinabove, the ingredients provide the necessary binder to hold the particles together. Additional substances may be added to form a more permanent binder. The exterior of the pellets may also be coated with a suitable substance impervious to water, to prevent the disintegration of the food particles when floating on the water. Such substances are preferably foods, or of such nature as to be harmless to digestion.

In Figs. 5, 6, and 7, I have illustrated a reciprocating type of cut-off mechanism embodying a frame 61 having an upper slide bar 62 and a bottom slide bar 63 mounted therein for individual vertical movement. The slide bars are provided with blades 64 and 65 respectively, illustrated more clearly in Fig. 7. A longitudinally extending notch 66 may be provided in the blade 65 and a teat 67 formed on the blade 64 which enters the notch 66 to provide a positive cut-off action which severs a pellet 16 and closes its ends. A shaft 68, mounted in the frame 64, is driven by a worm wheel 69 from the worm 49. Links 71 are pivoted to the slide bars 62 and to the gear 69 and a plate 72 on opposite sides of the frame in eccentric relation to produce a reciprocating movement to the cross slide. Cams 73 are mounted on the shaft in engagement with cam rings 74 for reciprocating the slide 63. A plate 76 bridges the space between the front of the dies 14 and the blades 64 and 65 and extends therebeyond at 77. An additional plate 78 is mounted above the plate 76 providing a space between which the extruded material passes. As the blades 64 and 65 reciprocated, the plates 76 and 78 strip the tubular material from the blades and it is at all times free to pass therebetween when the blades are separated. The frame may be oscillated to have the blades advance with the tubular material during the cutting and sealing operation. The driving of the gear 49 occurs in timed relation with the advancement of the ram 21 and the length of the pellets is thereby controlled. This length may be changed through the changing of the worm set 49 and 69 to provide a difference in the time of operation of the blades. The pellet is illustrated in Fig. 8 as having a wall 79 of predetermined thickness and a hollow interior 81 with the ends 82 sealed so that after drying the pellet will float upon water.

The fish food manufactured from the materials above set forth provides a balanced food having ingredients selected for their particular food values and manufactured in the manner above set forth so that the food floats upon water. This prevents the sinking of foods which are heavier than water which contaminated the water in the pool, as well as the bottom of the pool, and large aquariums. By floating the food so that it can be picked up by the fish before it disintegrates and sinks, this contamination is avoided. The further advantage of this type of food resides in the medication which may be incorporated in the food when manufactured. The particular compounding of food and the floating of such food is a material advancement in the art over any foods heretofore employed in fish hatcheries, large aquariums, or employed by large or small scale users.

While I have described the floating pellets as being useful for fish food, I do not wish to be limited to this application, as certain food manufactured for consumption by animals, as well as for human consumption, could be made to float. I have in mind, breakfast food, noodles and the like, made of one or more ingredient which would float on broth, milk or other liquid.

While I have described and illustrated several embodiments of my invention, it will be apparent to those skilled in the art that various changes, omissions, additions, and substitutions may be made therein without departing from the spirit and scope of my invention, as set forth in the accompanying claims.

What I claim is:

1. A fish food made from a plurality of ingredients which, when combined and dried, is denser than the water it displaces so that the mixture would sink, and which is mechanically formed into pellets having a hollow interior causing the pellets to float.

2. A fish food made of screened ingredients formed into hollow particles by a mechanical process which causes the particles to float.

3. A fish food made from a plurality of prepared meals which are mechanically compacted into pellets having a hollow interior which causes the pellets to float.

4. A fish food made from a plurality of prepared meals which have been sifted through a fine mesh screen, thoroughly mixed, and containing at least one ingredient having medicinal properties, which is mechanically compacted into pellets having a hollow interior which causes the pellets to float.

5. A fish food pellet made of meals containing adhesive properties when moistened and kneaded and forming compacted walls of the hollow pellet which floats and all of which contains nutritional and medicinal properties.

ROY D. EISAMAN.